United States Patent [19]

Tsao

[11] Patent Number: 5,683,252

[45] Date of Patent: Nov. 4, 1997

[54] MULTI-FUNCTIONAL GAME AND LEARNING DEVICE

[76] Inventor: Chin-Chen Tsao, No. 152, Tung Hua Street, Chung Shan District, Taipeicity, Taiwan

[21] Appl. No.: 630,905

[22] Filed: Apr. 4, 1996

[51] Int. Cl.⁶ .................................................. G09B 1/06
[52] U.S. Cl. ..................... 434/195; 434/205; 434/208
[58] Field of Search .................................. 434/191, 195, 434/205, 200, 208, 209

[56] References Cited

U.S. PATENT DOCUMENTS

| | | | |
|---|---|---|---|
| 239,385 | 3/1881 | Frwin | 434/209 |
| 521,360 | 6/1894 | Bachmann | 434/208 |
| 2,663,096 | 12/1953 | McCurdy | 434/195 |
| 2,950,542 | 8/1960 | Steelman | 434/195 |
| 3,229,388 | 1/1966 | Smith | 434/195 |
| 3,766,667 | 10/1973 | Glassman | 434/195 |
| 4,168,583 | 9/1979 | Halpeon | 434/208 |
| 4,548,585 | 10/1985 | Kelly | 434/195 |
| 5,120,226 | 6/1992 | Tsai | 434/195 |
| 5,137,452 | 8/1992 | Pollock | 434/195 |
| 5,421,732 | 6/1995 | Trapnell | 434/195 |

FOREIGN PATENT DOCUMENTS 250063   2/1966   Austria ................................. 434/200

*Primary Examiner*—Paul J. Hirsch
*Attorney, Agent, or Firm*—Pro-Techtor International

[57] ABSTRACT

The present invention relates to a multi-functional game and learning device. More particularly, the present invention relates to a multi-functional game and learning device which can be used as a general wood block stacking toy designed to educate and instill simple arithmetic concepts even as games are being played, as well as to construct various toy figures and building structures. Thus, this multi-functional game learning device is both a toy and a learning tool.

1 Claim, 16 Drawing Sheets

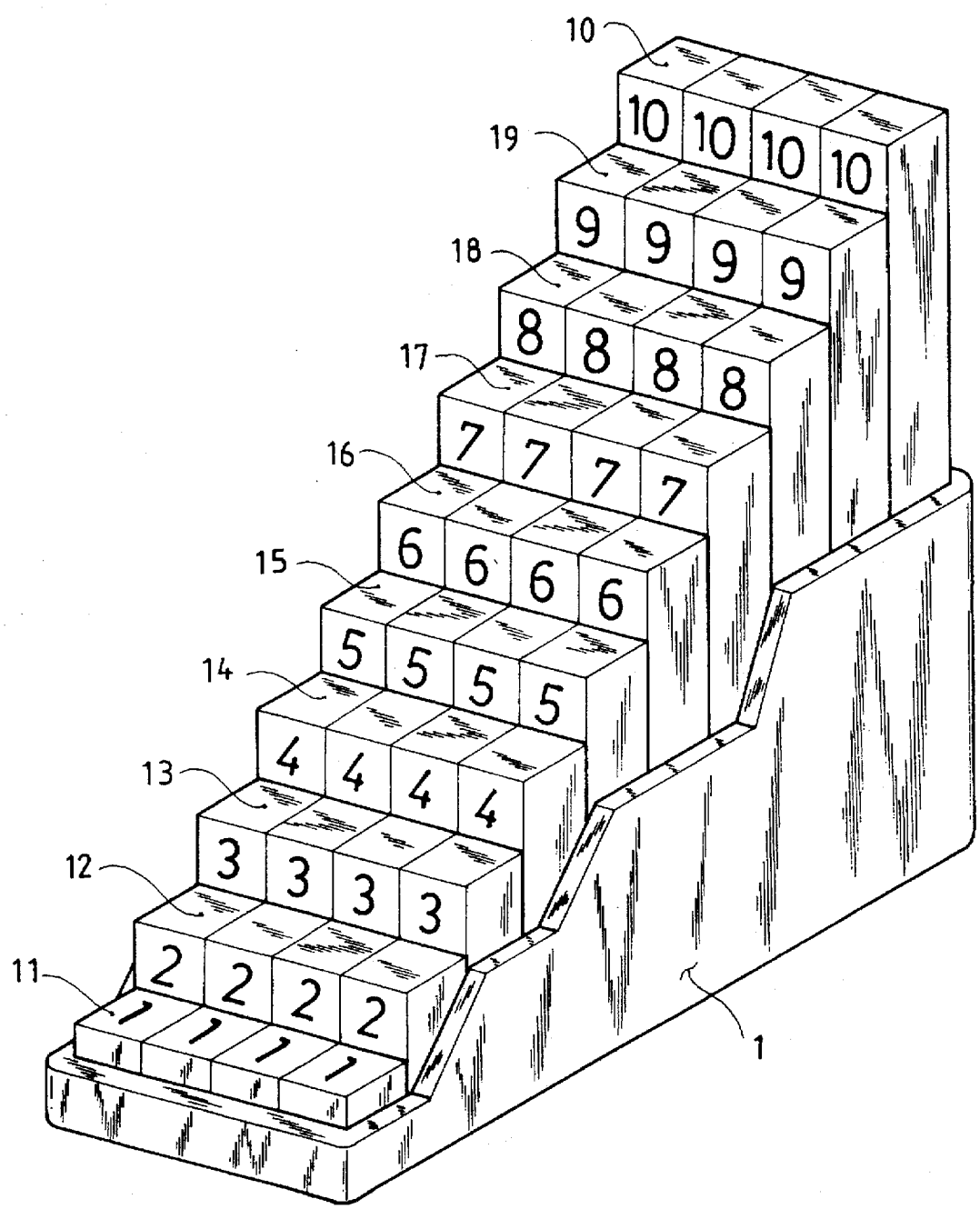
F I G. 1

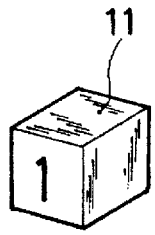
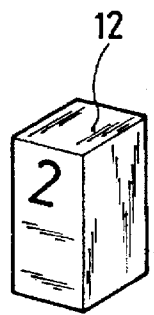
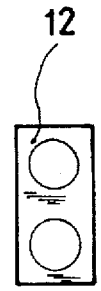
FIG.2  FIG.3  FIG.4  FIG.5
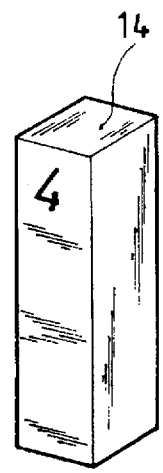
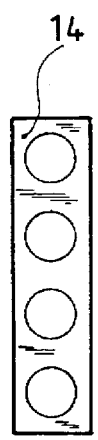
FIG.6  FIG.7  FIG.8  FIG.9

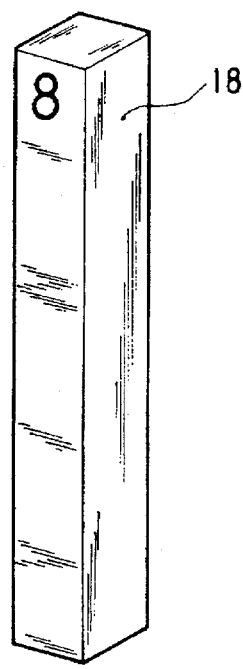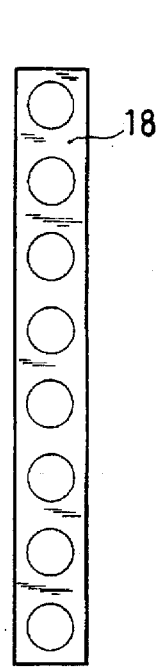
F I G. 16  F I G. 17  F I G. 14  F I G. 15
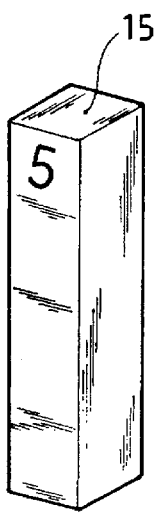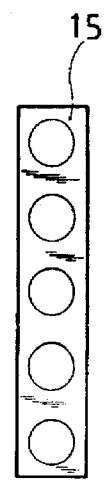
F I G. 12  F I G. 13  F I G. 10  F I G. 11

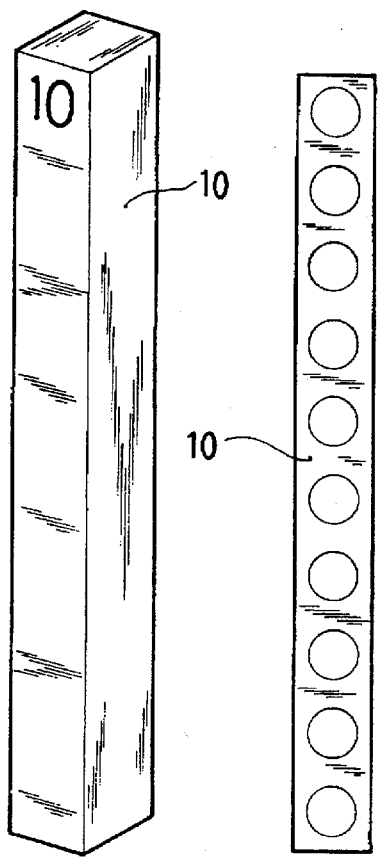
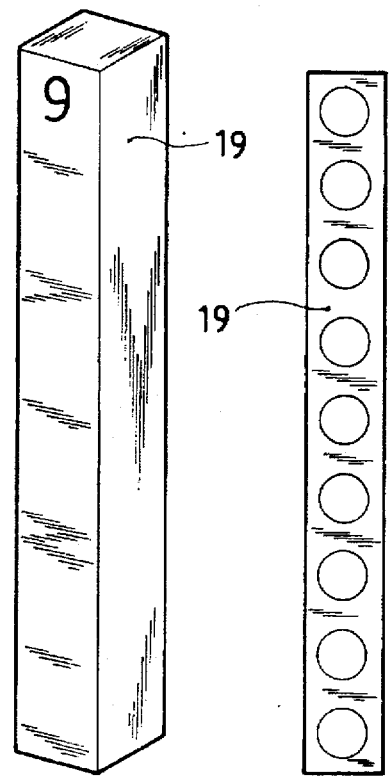
FIG. 20  FIG. 18
   FIG. 21    FIG. 19

MULTI-FUNCTIONAL GAME AND LEARNING DEVICE

(A) BACKGROUND OF THE INVENTION

(1) Field of the Invention

The present invention concerns a multi-functional game and learning device. More particularly, the present invention concerns a multi-functional game and learning device, which can be used as a general wood block stacking toy designed to educate and instill simple arithmetic concepts as games are played, as well as to construct various toy figures and building structures. Thus, this multi-functional game-learning device is both a toy and a learning tool.

(2) Description of the Prior Art

Conventional toys include toys that are designed for a single function, toys that rely on color effects to attract children's attention and the like. Thus, these conventional toys are merely a single-function playing device. In view of the fact that the desire for knowledge, survival instincts and curiosity are natural human characteristics and that children are particularly keen in developing these natural characteristics during their development years, and because conventional toys are not designed to nurture these characteristics in children, parents and teachers tend to look for toys and learning devices that are simply constructed, safe to use, and that can stimulate children to develop these characteristics while playing games. In view of the fact that conventional toys do not address the expectation of parents in terms of offering children toys with educational benefits, the inventor of the present invention conducted diligent research aimed at solving the problem of conventional toys not addressing the expectation of parents from the standpoint of designing toys with educational benefits, and arrived at the present invention after discovering a multi-functional game and learning device with which the problem of toys not specifically designed for educational benefits is solved.

(B) SUMMARY

The primary objective of the present invention is to offer a multi-functional game and learning device, which comprises a group of at least ten different types of block units of various lengths. Simple arithmetic calculations, including addition, subtraction, multiplication and division, can be performed by arranging these block units of various lengths. Accordingly, the multi-functional game learning device offers multiple benefits, being a toy as well as a learning tool.

Another objective of the present invention is to offer a multi-functional game-learning device, wherein block units of various lengths can be arranged and stacked together to form various toy shapes and building structures. Still another objective of the present invention is a multi-functional game-learning device, wherein the slot on the right side of an assembling tray is equipped with a protruding blocking, piece on the upper side and thus is shorter than the slot on the left side of the assembling tray, block units that match the width of the slot can be stacked from the bottom to the top of the slot, the length of the slot on the right side of the assembling tray being such that only nine block units can be accommodated, and the entire row of the regular blocks in the slot of the right side of the assembling tray has to be moved to the slot on the left side of the assembling tray for the accommodation of ten block units. Accordingly, a child playing this block stacking game must move the entire row (10 pieces) to the slot on the left side of the assembling tray, whenever the tenth piece is to be added. Thus, this device with a blocking piece is a novel device for teaching children to re-group the block unit pieces, whenever the tenth piece is to be added.

The structural characteristics of the present invention are described below in detail by means of the following practical example and of drawings which illustrate the merits and characteristics of the present invention.

(C) BRIEF DESCRIPTION OF THE DRAWINGS

FIG. 1 is a three-dimensional indicative drawing showing the multi-functional game and learning device of the present invention.

FIG. 2 is a three-dimensional drawing showing a block unit 11 of the present invention.

FIG. 3 is a rear-view drawing of the block unit 11 of the present invention.

FIG. 4 is a three-dimensional drawing showing a block unit 12 of the present invention.

FIG. 5 is a rear-view drawing of the block unit 12 of the present invention.

FIG. 6 is a three-dimensional drawing showing a block unit 13 of the present invention.

FIG. 7 is a rear-view drawing of the block unit 13 of the present invention.

FIG. 8 is a three-dimensional drawing showing a block unit 14 of the present invention.

FIG. 9 is a rear-view drawing of the block unit 14 of the present invention.

FIG. 10 is a three-dimensional drawing showing a block unit 15 of the present invention.

FIG. 11 is a rear-view drawing of the block unit 15 of the present invention.

FIG. 12 is a three-dimensional drawing showing a block unit 16 of the present invention.

FIG. 13 is a rear-view drawing of the block unit 16 of the present invention.

FIG. 14 is a three-dimensional drawing showing a block unit 17 of the present invention.

FIG. 15 is a rear-view drawing of the block unit 17 of the present invention.

FIG. 16 is a three-dimensional drawing showing a block unit 18 of the present invention.

FIG. 17 is a rear-view drawing of the block unit 18 of the present invention.

FIG. 18 is a three-dimensional drawing showing a block unit 19 of the present invention.

FIG. 19 is a rear-view drawing of the block unit 19 of the present invention.

FIG. 20 is a three-dimensional drawing showing a block unit 10 of the present invention.

FIG. 21 is a rear-view drawing of the block unit 10 of the present invention.

(D) DESCRIPTION OF THE PREFERRED EMBODIMENTS

Figure 22:
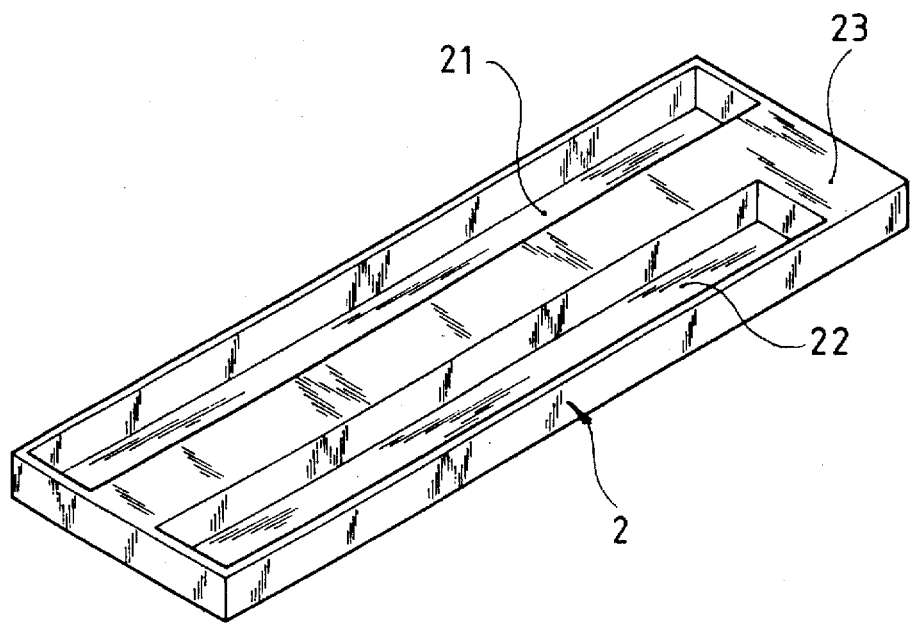
FIG. 22 is a three-dimensional indicative drawing showing the structure of an assembling tray 2 of the present invention.

As shown in FIG. 1, the multi-functional game and learning device of the present invention comprises a storage box 1, two sides of which are step-like in shape, and a set of block units 11 and 12~10 that are housed inside the storage box 1 in an orderly manner in accordance with their length.

As shown in FIGS. 2 and 3, the block unit 11 is a cube and is labeled as "1" on its front upper side. As shown in FIG. 3, the back side of the block unit 11 has an indented circular marking. The block unit 11 represents a basic unit. As shown in FIG. 4, a characteristic of the present invention is that the block unit 12 is labeled as "2" on its front upper side and that it is twice as long as the block unit 11. As shown in FIG. 5, the back side of a block unit 12 has two indented circular markings. In this manner, a block unit 13 is three times the length of the block unit 11, it is labeled as "3" on the front upper side and is equipped with three indented circular markings on the back side; a block unit 14 is four times as long as block unit 11, is labeled as "4" on the front upper side and is equipped with four indented circular markings on the back side; a block unit 15 is five times as long as the block unit 11, is labeled as "5" on the front upper side and is equipped with five indented circular markings on the back side; a block unit 16 is six times as long as the block unit 11, is labeled as "6" on the front upper side and is equipped with six indented circular markings on the back side; a block unit 17 has a length seven times that of block unit 11, is labeled as "7" on the front upper side and is equipped with seven indented circular markings on the back side; a block unit 18 has a length eight times that of block unit 11, is labeled as "8" on the front upper side and is equipped with eight indented circular markings on the back side; a block unit 19 has a length nine times that of block unit 11, is labeled as "9" on the front upper side and is equipped with nine indented circular markings on the back side; and a block unit 10 is ten times as long as block unit 11, is labeled as "10" on the front upper side and is equipped with ten indented circular markings on the back side (see FIGS. 6–21).

Because these block units have indented circular markings on their back side, a blind person can identify the blocks by feeling the number of indented circular markings.

Figure 23:
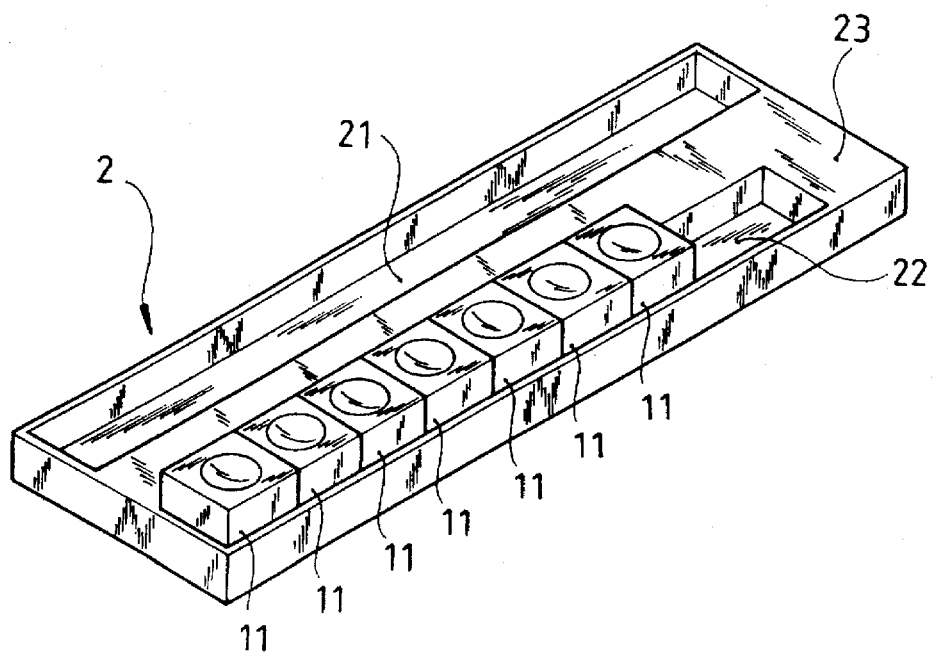
FIG. 23 is a three-dimensional indicative drawing showing the implementation of the assembling tray 2 of the present invention.
Figure 24:
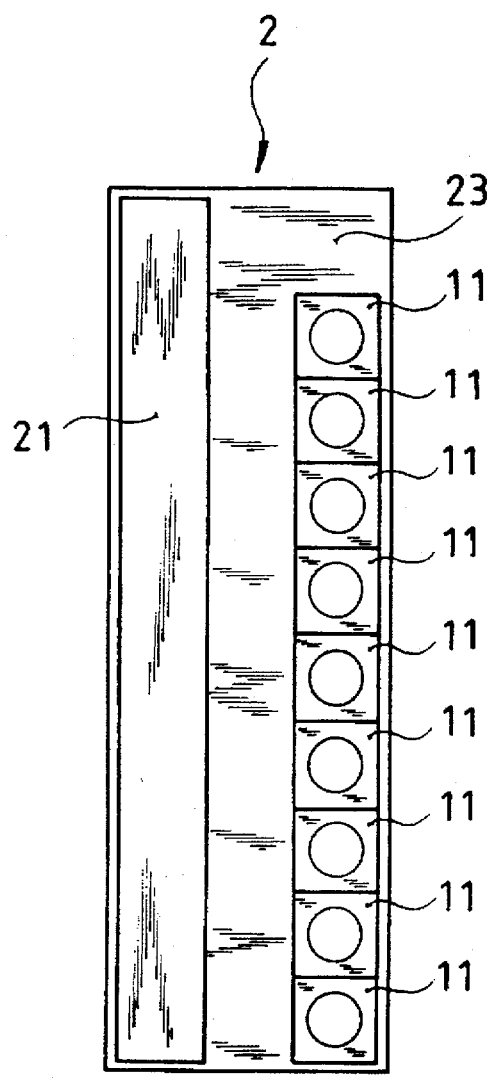
FIG. 24 is a top-view indicative drawing showing an assembly of the assembling tray 2 of the present invention.
Figure 25:
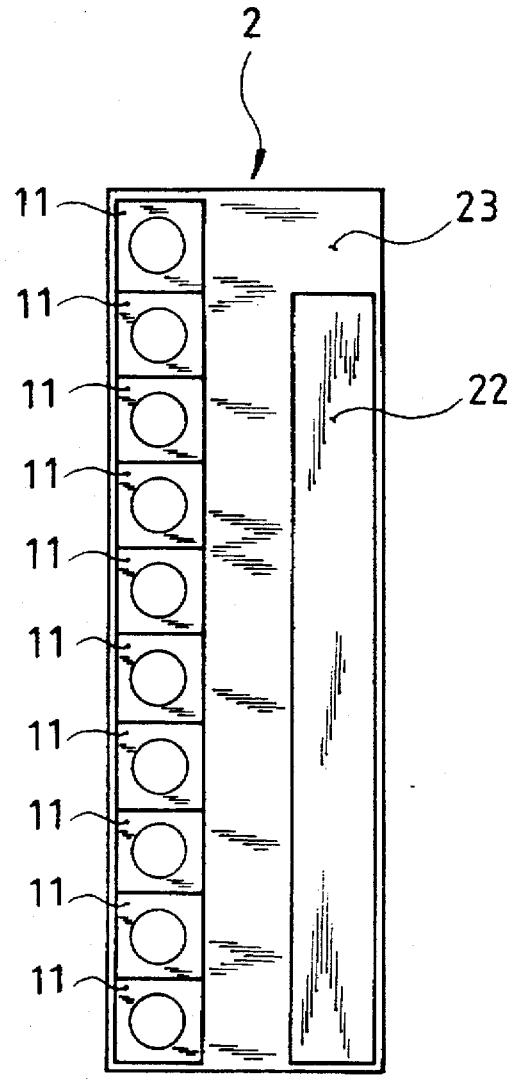
FIG. 25 is another top-view indicative drawing showing an assembled assembling tray 2 of the present invention.

Simple arithmetic operations (i.e., addition, subtraction, multiplication and division) can be carried out with these block units. The multi-functional game learning device of the present invention also includes an assembling tray 2 for young children to perform arithmetic operations exceeding the number 10. As shown in FIG. 22, the assembling tray 2 is equipped with a left-side slot 21 and a right-side slot 22, and the upper side of the right-side slot 22 is equipped with a protruding blocking piece 23. The depth of the left-side slot 21 and right-side slot 22 is only half of the height of the block unit 11, so that the top half of the block unit 11 placed in the assembling tray 2 is exposed to facilitate removal. Furthermore, the length, width and height of the block unit 11 are required to be the same as the width of the left-side slot 21 and the right-side slot 22, so that the block units 11 can be stacked and aligned in an orderly manner inside the left-side slot 21 and right-side slot 22. FIG. 23 shows the block units 11 being stacked and aligned in an orderly manner from the bottom to the top of the right-side slot 22. FIG. 24 is a top-view indicative drawing showing a mode of assembling tray 2 of the present invention. Since the upper side of the right-side slot 22 is equipped with a protruding blocking piece 23 to limit the number of block units 11 that can be placed inside the right-side slot 22 to nine while the left-side slot is designed to house 10 block units 11, the entire row of the block units 11 has to be transferred from the right-side slot 22 to the left-side slot 21, when the tenth piece is to be added after inserting nine block units 11 in accordance with the above-mentioned stacking procedure. Accordingly, the device causes the user to develop the habit of re-grouping upon arriving at ten block units 11, thus making it possible for the toy to function also as a learning tool.

Figure 26:
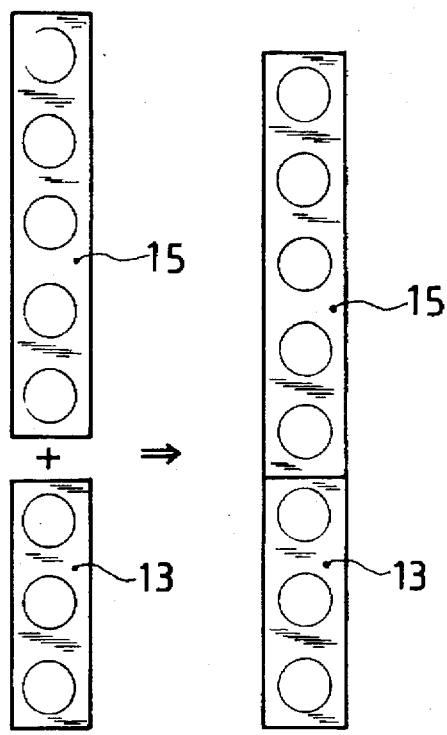
FIG. 26 is an indicative drawing showing the implementation of an addition operation of the present invention.

The above-mentioned block units 11~10 have different lengths, which are all multiples of the length of block unit 11. FIG. 26 is an indicative drawing showing the implementation of an addition operation of the present invention. As shown in the figure, which shows a block unit 15 connected to a block unit 13, one can count accurately a total of eight indented circular markings on the back side of these two blocks, once the block units 15 and 13 are aligned. Furthermore, the above-mentioned block unit 15 is five times as long as the block unit 11 and the block unit 13 is three times as long block unit 11. Accordingly, the lengths of the different block units can lead children to understand the concept of numbers.

Figure 27:
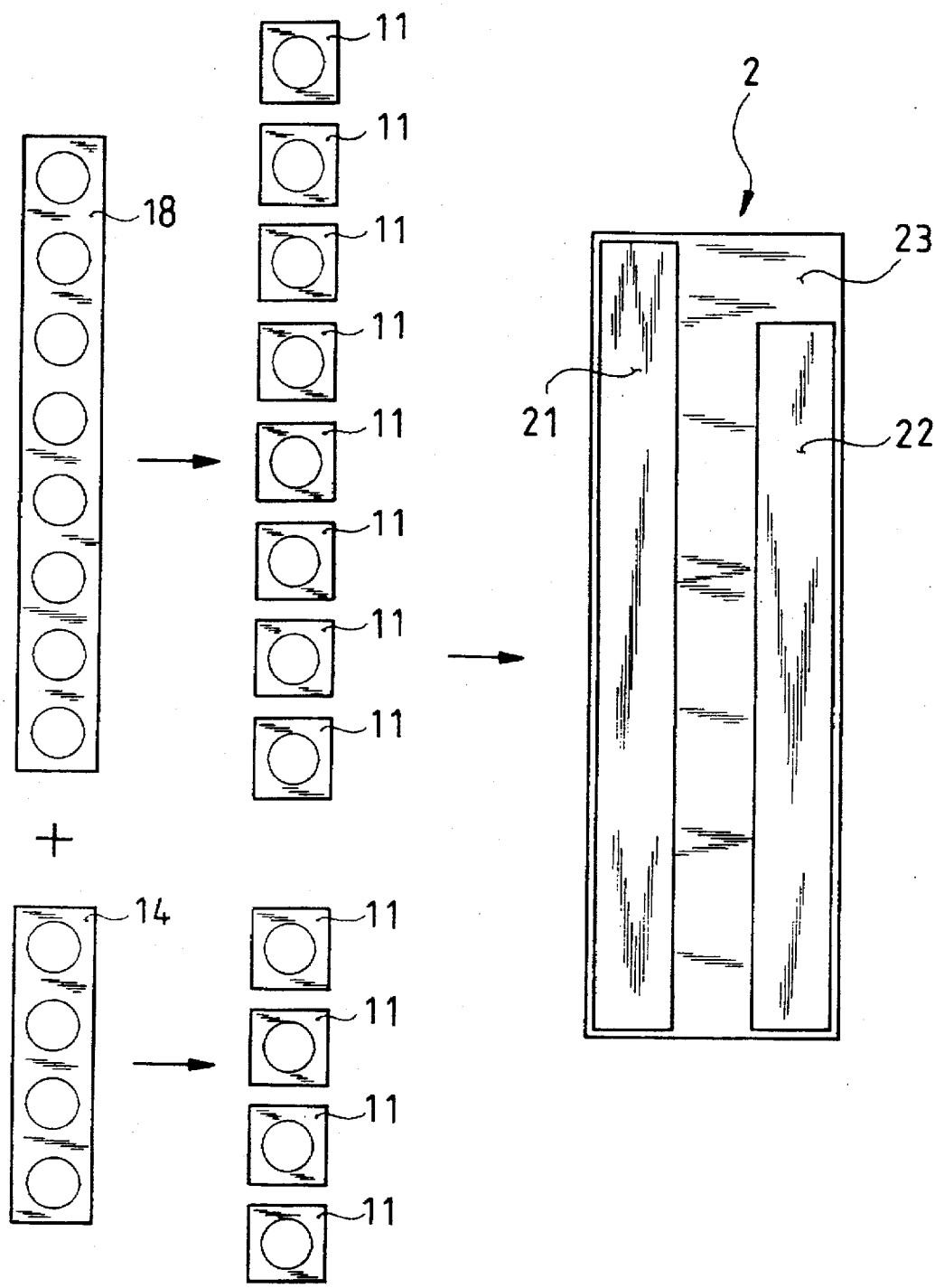
FIGS. 27 and 28 are indicative drawings showing the implementation of other addition operations of the present invention.
Figure 28:
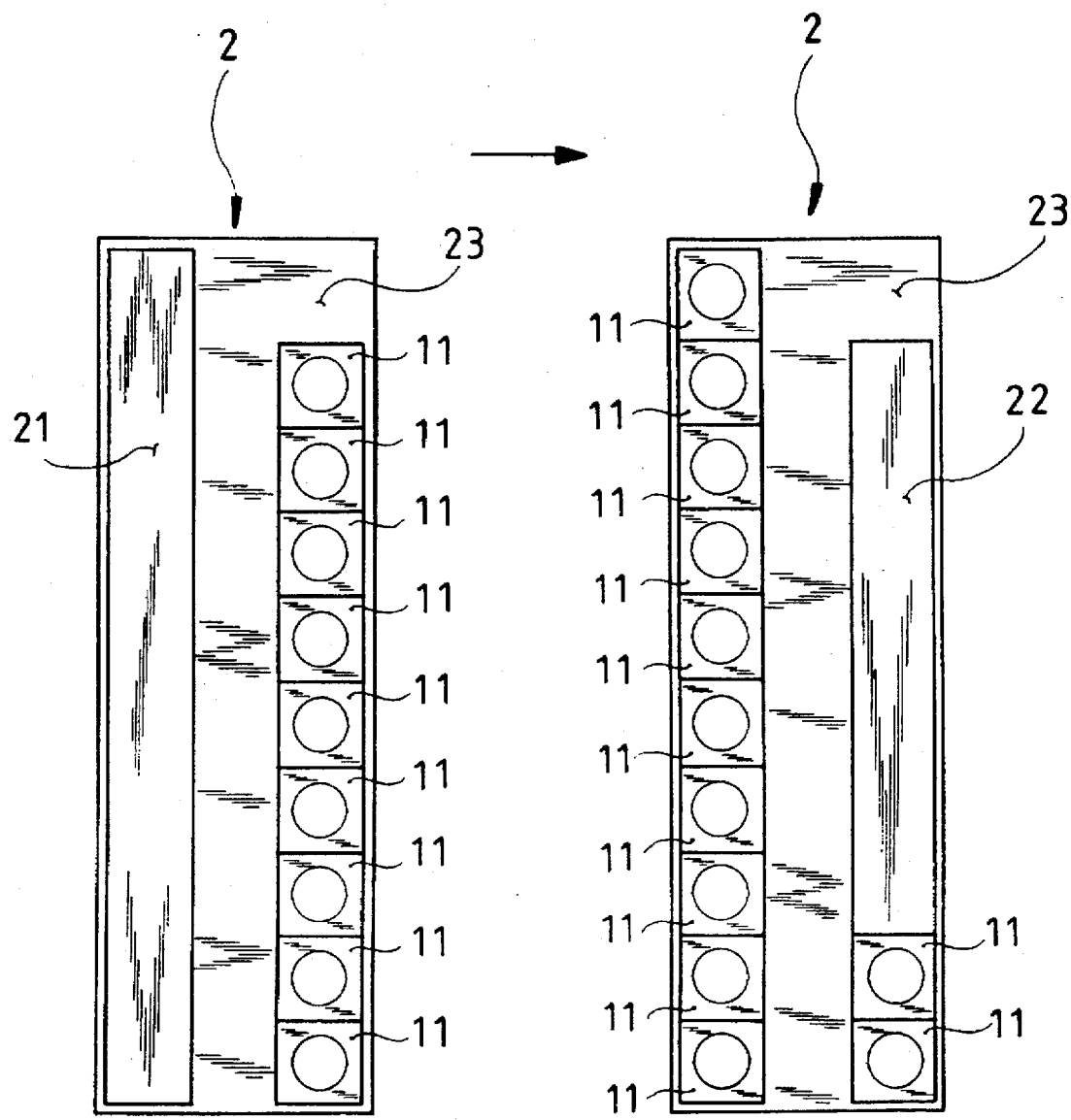

FIGS. 27 and 28 are indicative drawings showing the implementation of other addition operations of the present invention. Specifically, the arithmetic operation to be executed is 8+4. The operation involves using a block unit 18 and a block unit 14, converting the block unit 18 and block unit 14 to individual units (i.e., the most basic unit) of eight block units 11 and four block units 11 respectively, and placing the block units 11 into the right-side slot 22 of the assembling tray 2. Since the upper part of the right-side slot 22 of the assembling tray 2 of the present invention is equipped with a protruding blocking piece 23, which limits the number of the block units 11 housed in the right-side slot 22 to nine, the entire row of the block units 11 has to be transferred from the right-side slot 22 to the left-side slot 21, when the tenth piece is to be added after inserting nine block units 11. Accordingly, the device causes the user to develop the habit of re-grouping upon arriving at ten block units 11. The remaining block units 11 are each placed inside the right-side slot 22 from the bottom to the top. As shown in the figure, the left-side slot 21 of the assembling tray 2 possesses a row of ten block units 11, while the right-side slot 22 possesses two block units 11. The number of block units 11 in the right-side slot 22 represents arithmetically the unit value, and the row of ten block units 11 in the left-side slot 21 represents arithmetically a ten value. Thus, the result obtained from the process of stacking the block units of the present invention corresponds to (8+4=12) obtained arithmetically.

Figure 29:
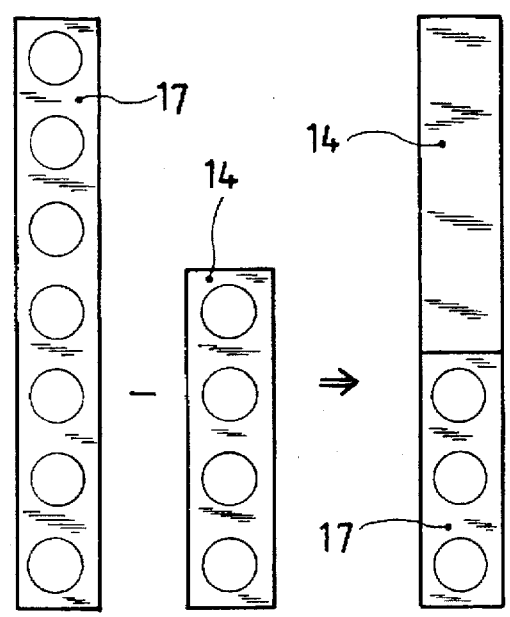
FIG. 29 is an indicative drawing showing the implementation of a subtraction operation of the present invention.

FIG. 29 is an indicative drawing showing the implementation of a subtraction operation of the present invention. The figure shows the arithmetic operation of 7−3, which involves using the block units 17 and 14 of the present invention, and placing the block unit 14 onto the block unit 17, with the circular markings of the block unit 14 facing downward. As shown in the figure, there are three remaining indented circular markings, which corresponds to (7−4=3) obtained arithmetically. Moreover, the answer can be obtained by using the technique described in the above-mentioned "addition method". Specifically, the block unit 17 and block unit 14 are convened to individual units (i.e., the most basic unit) of seven block units 11 and four block units 11 respectively (not shown in the figure), and the two sets of block units 11 are arranged against each other. As a result, there are three remaining block units 11, which also corresponds to (7−4=3).

Figure 30:
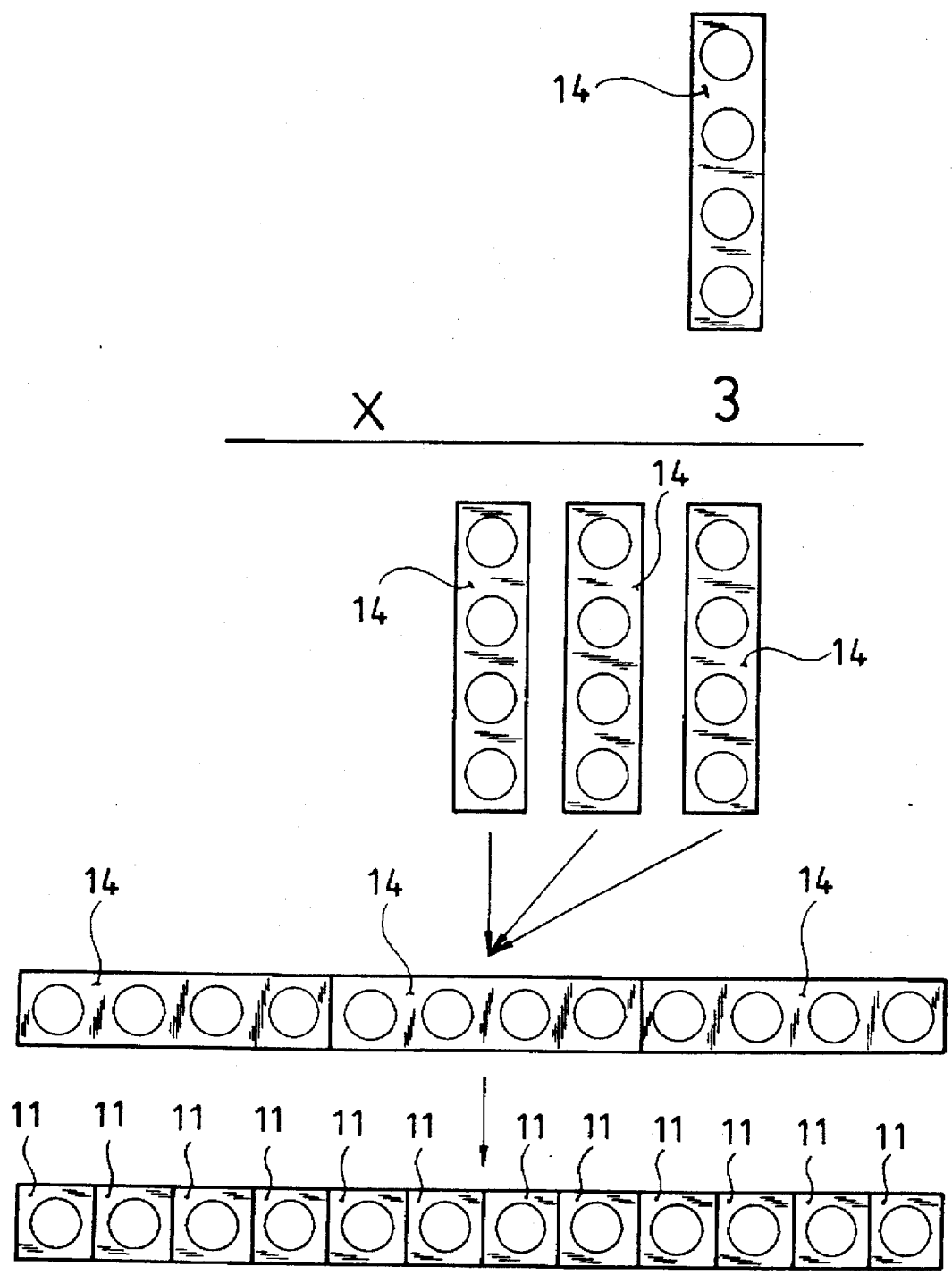
FIGS. 30 and 31 are indicative drawings showing the implementation of a multiplication operation of the present invention.
Figure 31:
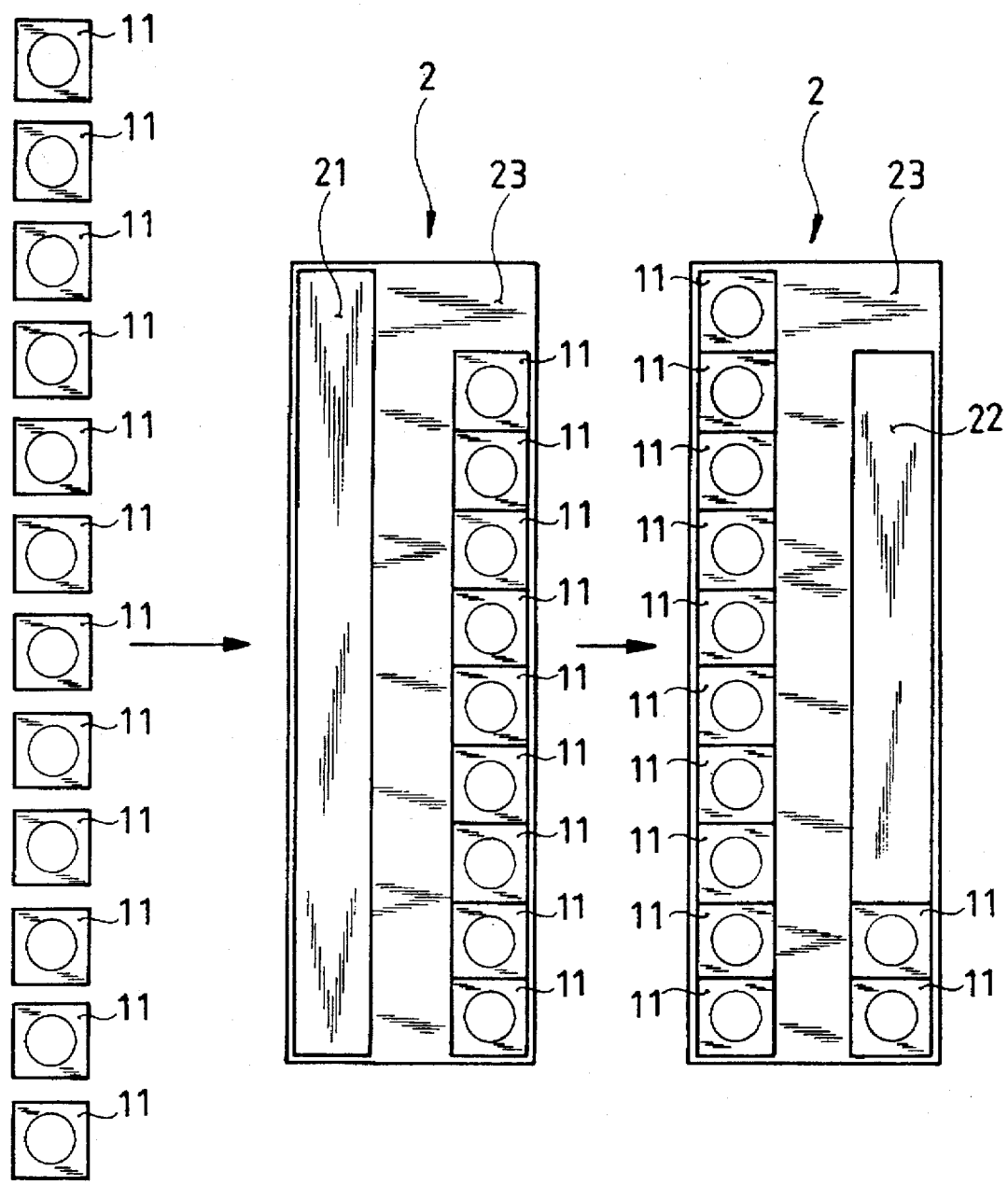

FIGS. 30 and 31 are indicative drawings showing the implementation of a multiplication operation of the present invention. The figures show an arithmetic operation of 4×3. The operation involves counting three of the block unit 14. The answer can also be obtained by using three of the block unit 14, converting the block units 14 to individual units (i.e., the most basic unit) of block units 11 with a total length corresponding to the total length of the block units 14, and placing the block units 11 into the right-side slot 22 of the assembling tray 2. Since the upper part of the right-side slot 22 of the assembling tray 2 of the present invention is equipped with a protruding blocking piece 23, which limits the number of the block units 11 housed in the right-side slot 22 to nine, the entire row of the block units 11 has to be transferred from the right-side slot 22 to the left-side slot 21, when the tenth piece is to be added after inserting nine block units 11. Accordingly, the device causes the user to develop the habit of re-grouping upon arriving at ten block units 11. The remaining block units 11 are each placed inside the right-side slot 22 from the bottom to the top. As shown in the figure, the left-side slot 21 of the assembling tray 2 possesses a row of ten block units 11, while the right-side slot 22 possesses two block units 11. The number of block units 11 in the right-side slot 22 represents arithmetically the unit value, and the row of ten block units 11 in the left-side slot 21 represents arithmetically a ten value. Thus, the result obtained from the process of stacking the block units of the present invention corresponds to (4×3=12) obtained arithmetically.

Figure 32:
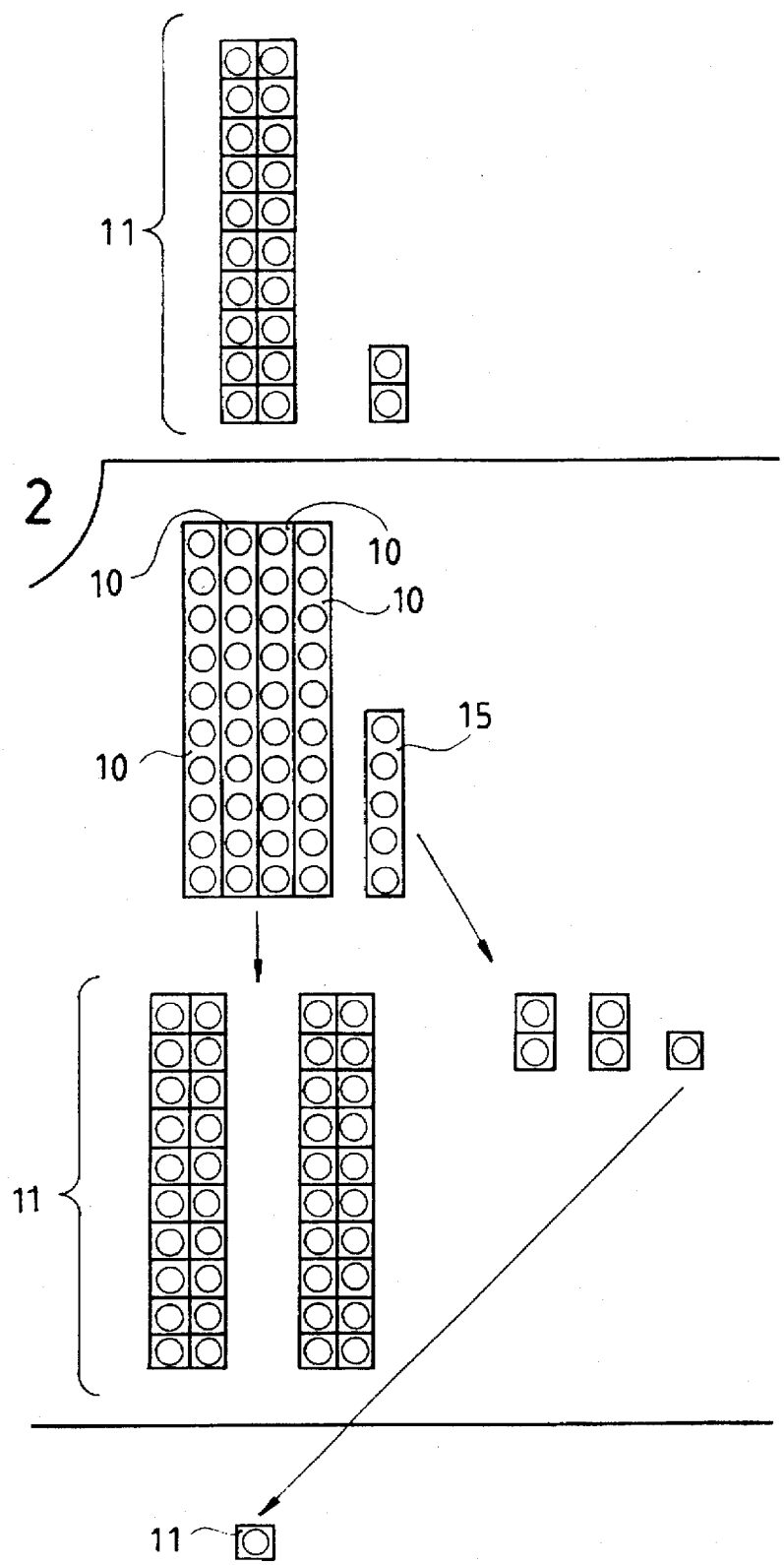
FIGS. 32 and 33 are indicative drawings showing the implementation of a division operation of the present invention.
Figure 33:
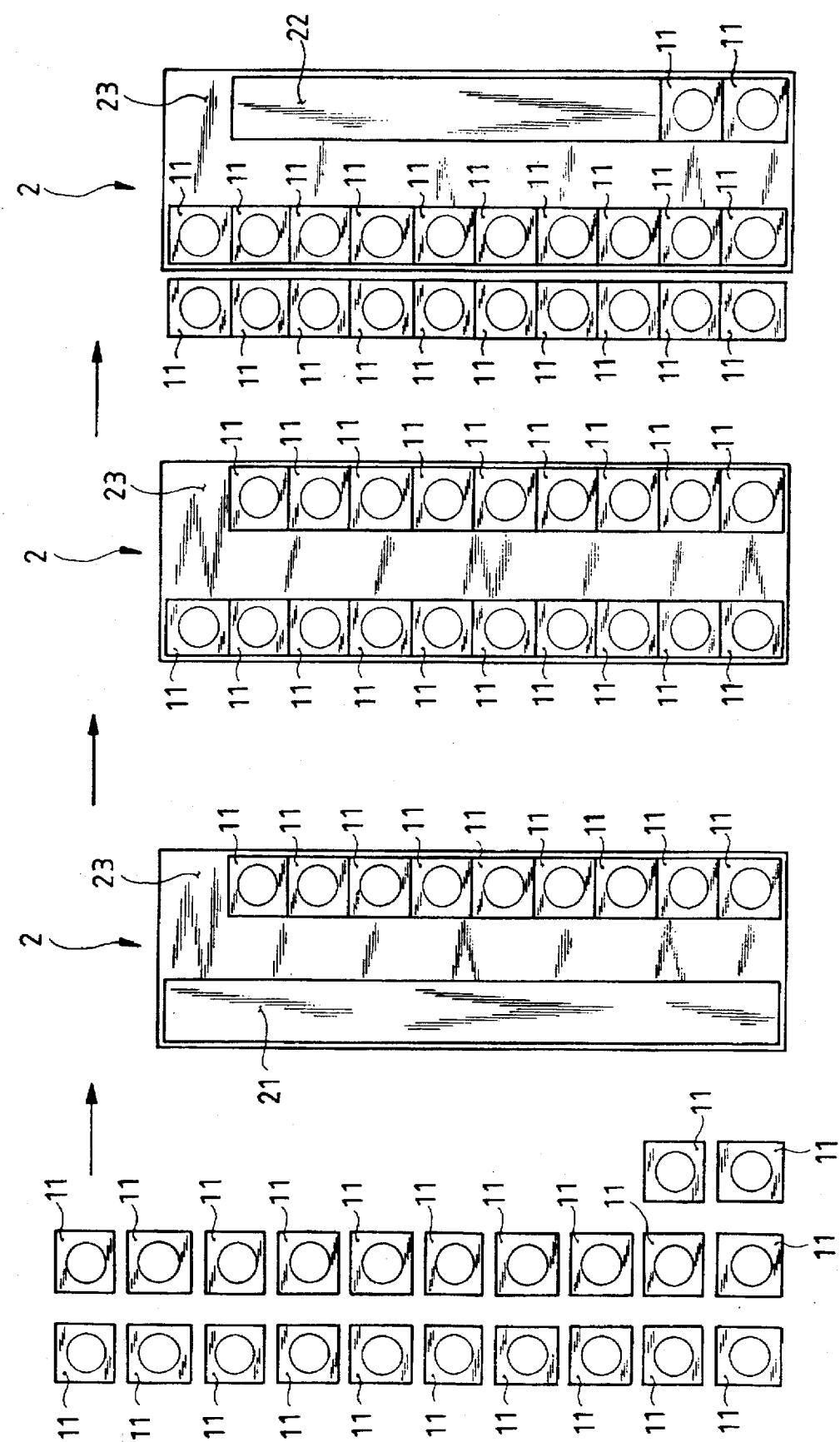

FIGS. 32 and 33 are indicative drawings showing the implementation of a division operation of the present invention. The figures represent the arithmetic operation 45÷2. The operation involves using four of the block units 10 and a block unit 15 (i.e., the four block units 10 represent four ten values and the block unit 15 represents five unit values), converting the four block units 10 and the block unit 15 to individual units (i.e., the most basic unit) of forty block units 11 and five block units 11 respectively, separating the forty block units 11 into two groups so that each group contains twenty block units 11, and then separating the five block units 11 into two groups so that each group contains two block units 11 together with one remaining block unit 11. The result corresponds to (45÷2=22 . . . remaining 1) obtained mathematically. The multi-functional game learning device of the present invention is equipped with the assembling tray 2 to facilitate for young children the solution of problems of this kind. Specifically, the above-mentioned individual units of forty-five block units 11 are divided into two groups with one remaining block unit 11, and the block units 11 in one of the two groups are placed individually into the right-side slot 22 of the assembling tray 2. Since the upper part of the right-side slot 22 of the assembling tray 2 of the present invention is equipped with a protruding blocking piece 23, which limits the number of the block units 11 housed in the right-side slot 22 to nine, the entire row of the block units 11 has to be transferred from the right-side slot 22 to the left-side slot 21, when the tenth piece is to be added after inserting nine block units 11. The remaining block units 11 are each placed inside the right-side slot 22 from the bottom to the top, and the entire row of the block units 11 has to be transferred from the right-side slot 22 to the left-side slot 21, when the tenth piece is to be added after inserting nine block units 11. As shown in the figures, the result is that there are two rows of block units 11 (i.e., each row containing ten block units 11) that are being transferred to the left-side slot 21 and there are two individual block units 11 in the right-side slot 22. Thus, the answer also corresponds to (45÷2=22 . . . remaining 1) obtained mathematically.

Figure 34:
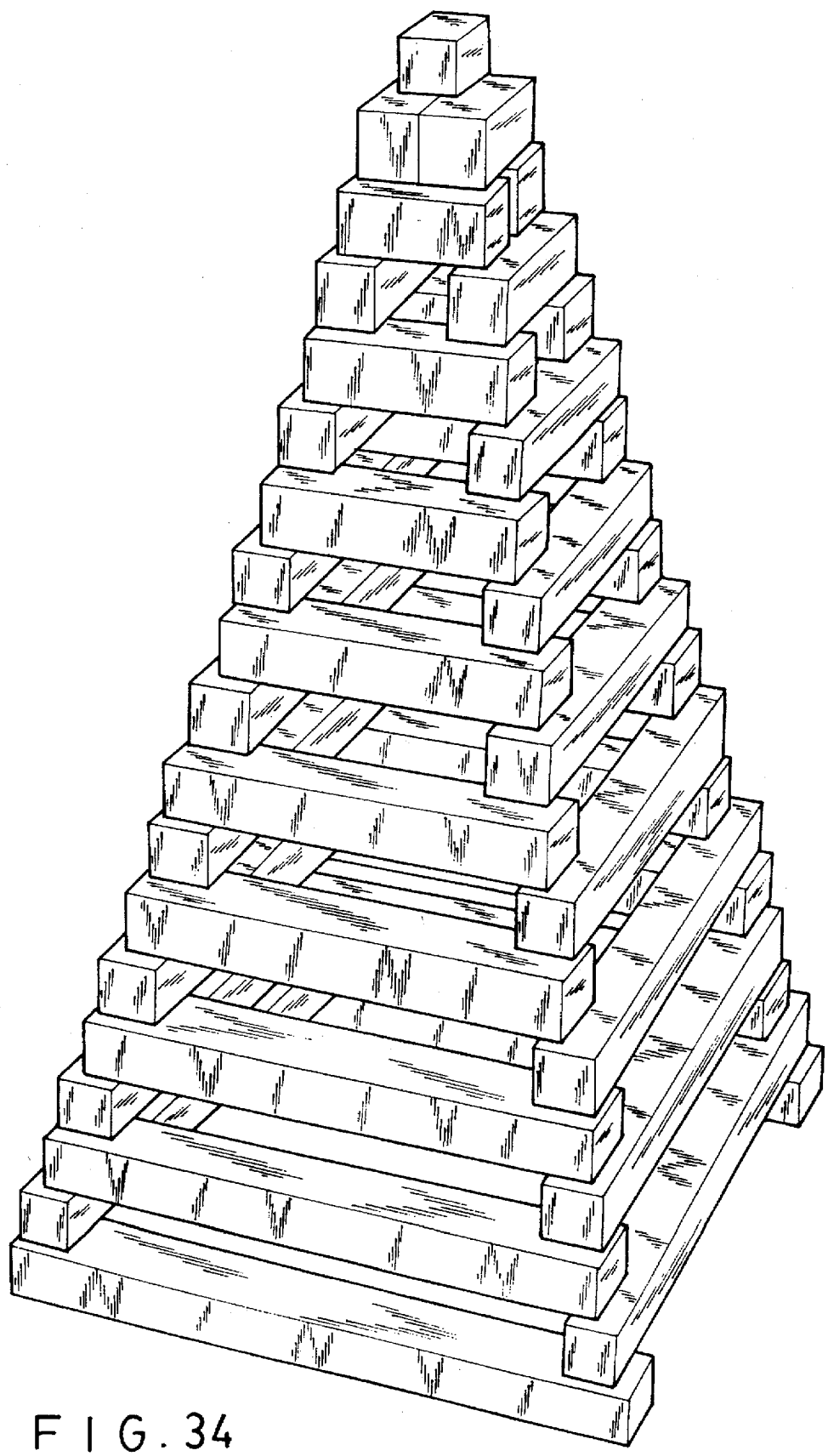
FIG. 34 is a three-dimensional drawing showing assembled block units according to the present invention.
Figure 35:
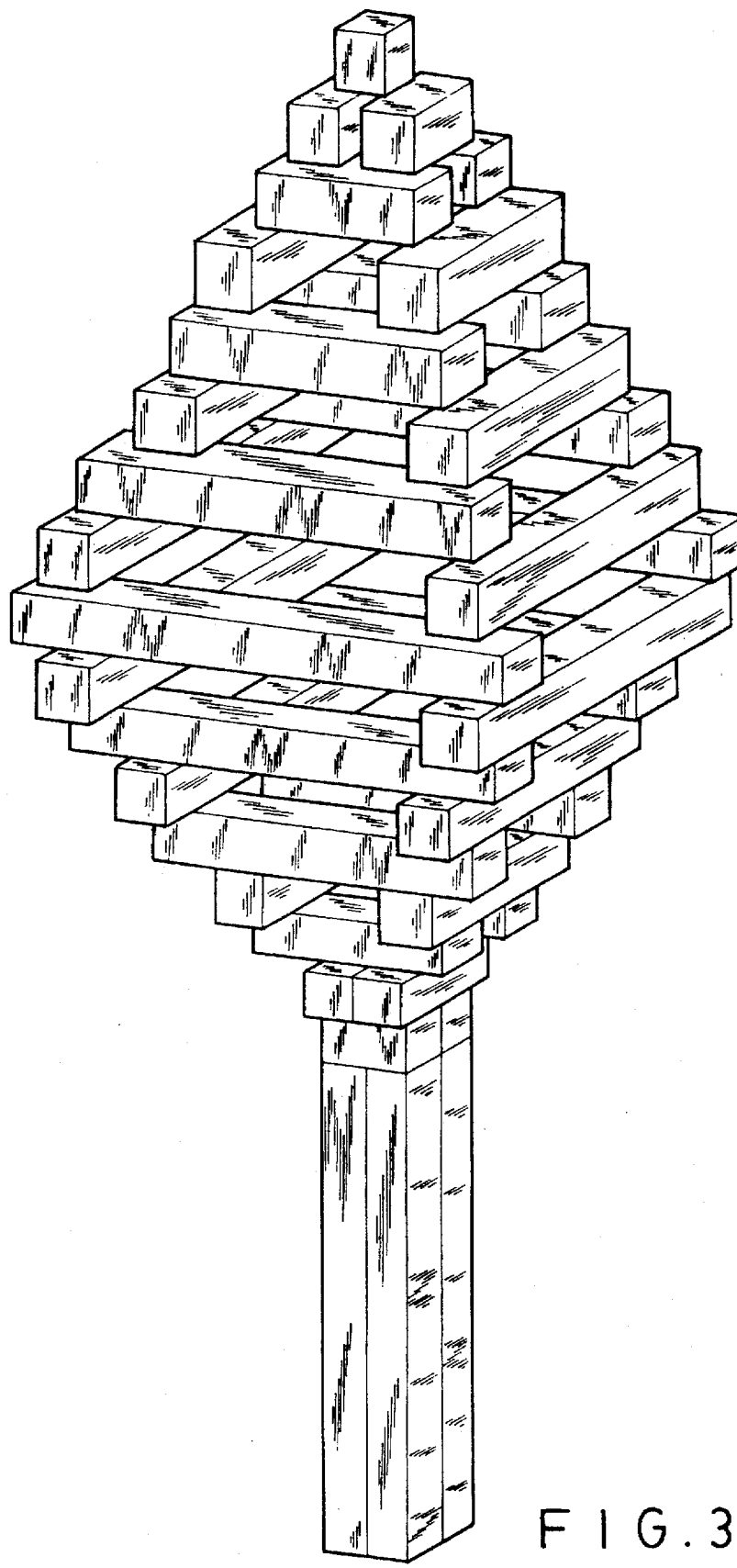
FIG. 35 is another three-dimensional drawing showing assembled block units of the present invention.
Figure 36:
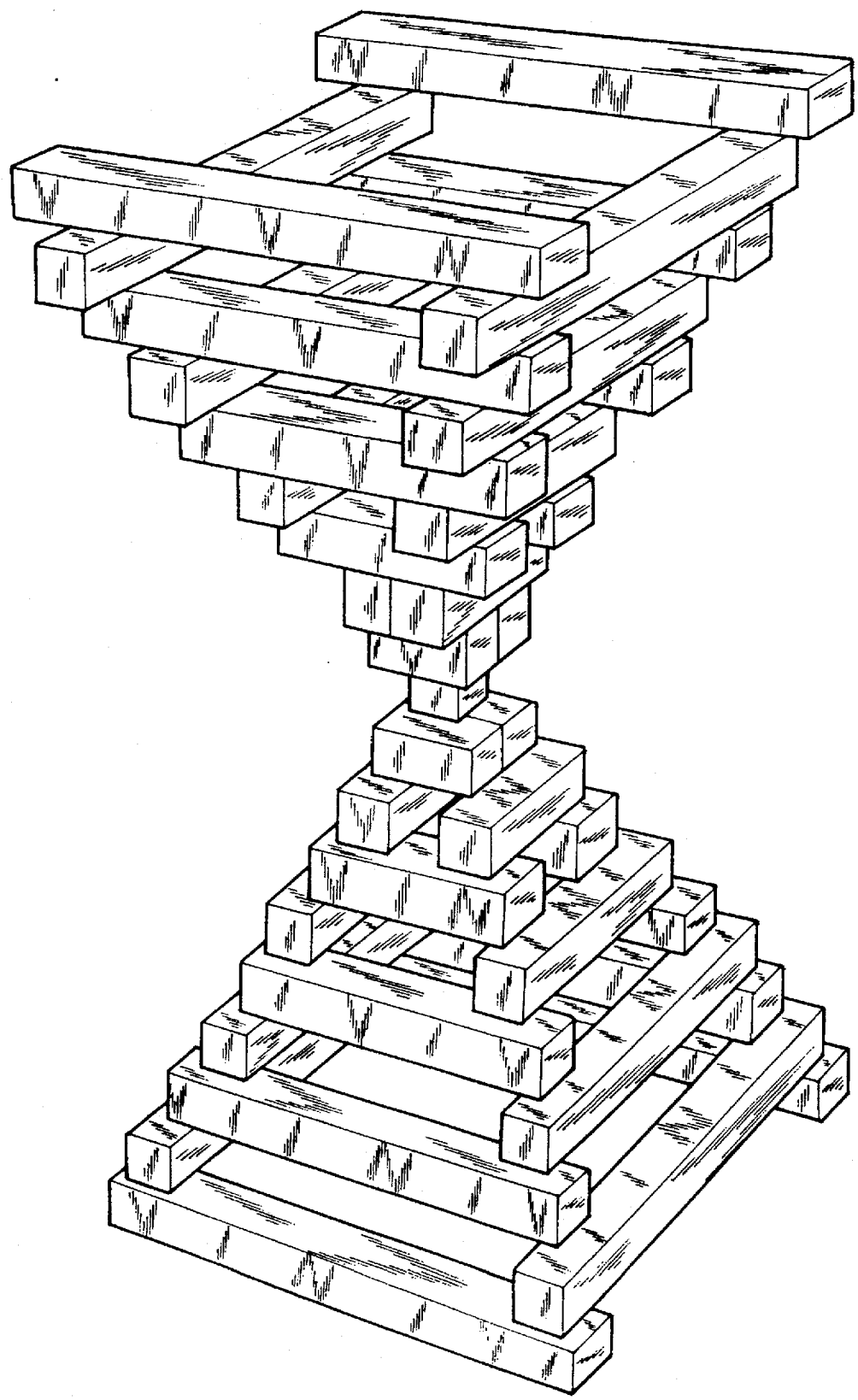
FIG. 36 is yet another three-dimensional drawing showing assembled block units of the present invention.

As shown in FIGS. 34, 35 and 36, the various block units of the present invention, can be used not solely for the above-mentioned arithmetic operations (i.e., addition, subtraction, multiplication and division), but they may also be used for stacking games involving various toy figures and structures. From these block units of different lengths, children learn about the concept of balance, are encouraged to be creative and the like.

As described above, the multi-functional game learning device of the present invention is novel and multi-functional in that it can be used as an arithmetic learning tool and as a toy for creating various toy figures and building structures.

I claim:

1. A multi-functional game/learning device, comprising (a) a storage box 1 in the shape of a cup with two sides in a step-like shape, (b) a multiple number of block units 11 each labeled as "1" on the front upper side and equipped with an indented circular marking on its back side, (c) a multiple number of block units 12 each labeled as "2" on the front upper side and equipped with two indented circular markings on the back side and having a length two times that of block unit 11, (d) a multiple number of block units 13 each labeled as "3" on the front upper side, equipped with three indented circular markings on the back side and of a length three times that of block unit 11, (e) a multiple number of block units 14 each labeled as "4" on the front upper side, equipped with four indented circular markings on the back side and having a length four times that of block unit 11, (f) a multiple number of block units 15 each labeled as "5" on the front upper side, equipped with five indented circular markings on the back side and having a length five times that of block unit 11, (g) a multiple number of block units 16 each labeled as "6" on the front upper side, equipped with six indented circular markings on the back side and having a length six times that of block unit 11, (h) a multiple number of block units 17 each labeled as "7" on the front upper side, equipped with seven indented circular markings on the back side and having a length seven times that of block unit 11, (i) a multiple number of block units 18 each labeled as "8" on the front upper side, equipped with eight indented circular markings on the back side and having a length eight times that of block unit 11, (j) a multiple number of block units 19 each labeled as "9" on the front upper side, equipped with nine indented circular markings on the back side and having a length nine times that of block unit 11, (k) a multiple number of block units 10 each labeled as "10" on the front upper side, equipped with ten indented circular markings on the back side and having a length ten times that of block unit 11, and (1) an assembling tray 2 equipped with a left-side slot 21 and a right-side slot 22, with the width of the left- and right-side slots 21 and 22 corresponding to the width of the above-mentioned block unit 11 and the depth of the left- and right-side slots 21 and 22 corresponding to one half of the height of the above-mentioned block unit 11, which is characterized by the fact that the above-mentioned block units 11, 12, 13, 14, 15, 16, 17, 18, 19 and 10 are of different lengths and are identified by different circular marking patterns on their back sides, thereby allowing additions, subtractions, multiplications and divisions to be performed easily by connecting or stacking these different block units in accordance with their number of indented circular markings or lengths, and that these different block units can be stacked together to build toy figures and building structures.

* * * * *